(12) United States Patent
Jones

(10) Patent No.: US 12,416,364 B2
(45) Date of Patent: Sep. 16, 2025

(54) BALL VALVE, CHARACTERIZED ORIFICE INSERT, AND METHOD OF MAKING THE SAME

(71) Applicant: Aalberts Integrated Piping Systems Americas, Inc., Charlotte, NC (US)

(72) Inventor: Timothy Daniel Jones, Esmont, VA (US)

(73) Assignee: AALBERTS INTEGRATED PIPING SYSTEMS AMERICAS, INC., Charlotte, NC (US)

( * ) Notice: Subject to any disclaimer, the term of this patent is extended or adjusted under 35 U.S.C. 154(b) by 0 days.

(21) Appl. No.: 18/530,903

(22) Filed: Dec. 6, 2023

(65) Prior Publication Data

US 2025/0189044 A1    Jun. 12, 2025

Related U.S. Application Data

(60) Provisional application No. 63/430,464, filed on Dec. 6, 2022.

(51) Int. Cl.
*F16K 5/06* (2006.01)
*F16K 31/60* (2006.01)

(52) U.S. Cl.
CPC .......... *F16K 5/0605* (2013.01); *F16K 5/0647* (2013.01); *F16K 31/602* (2013.01)

(58) Field of Classification Search
CPC .... F16K 5/0605; F16K 5/0647; F16K 31/602; F16K 5/12; F16K 5/0689; F16K 27/067; F16K 47/08

(Continued)

(56) References Cited

U.S. PATENT DOCUMENTS 3,209,779 A    10/1965    McGowen, Jr.
3,563,511 A    2/1971    Bentley-Leek
(Continued)

FOREIGN PATENT DOCUMENTS

CN    2883820 Y    3/2007
EP    0085565 A1    8/1983
(Continued)

OTHER PUBLICATIONS

International Search Report and Written Opinion issued in PCT Application No. PCT/IB2023/062328, mailed Mar. 19, 2024, 16 pages.

*Primary Examiner* — John Bastianelli
(74) *Attorney, Agent, or Firm* — Womble Bond Dickinson (US) LLP

(57) ABSTRACT

The present disclosure provides a ball valve assembly and a method of manufacturing a ball valve assembly. In one example embodiment, the method comprises providing a pair of end caps, providing a rotary ball including a bore formed therethrough, providing a handle operatively connected to the rotary ball and configured to rotate the rotary ball, providing a characterization orifice insert including a characterization shape, positioning the rotary ball between the pair of end caps, and positioning the characterization orifice insert proximate the rotary ball. Before the characterization orifice insert is positioned proximate the rotary ball, the characterization orifice insert may be converted and/or formed from an initial state into a final state, wherein the characterization shape of the characterization orifice insert in the initial state differs from the characterization shape of the characterization orifice insert in the final state.

9 Claims, 6 Drawing Sheets

(58) Field of Classification Search
USPC .......................................... 251/315.16, 209
See application file for complete search history.

(56) References Cited

U.S. PATENT DOCUMENTS

| | | | |
|---|---|---|---|
| 3,860,032 | A | 1/1975 | Rogers |
| 5,074,522 | A | 12/1991 | Reynolds et al. |
| 5,937,890 | A | 8/1999 | Marandi |
| 6,039,304 | A | 3/2000 | Carlson et al. |
| 6,109,591 | A | 8/2000 | Tuttle et al. |
| 6,910,673 | B2 | 6/2005 | Green et al. |
| 7,111,643 | B2 * | 9/2006 | Oh .............................. F16K 5/12 251/118 |
| 7,367,544 | B2 * | 5/2008 | Oh .............................. F16K 5/12 251/315.1 |
| 8,413,684 | B2 * | 4/2013 | Thomas .................. F16K 5/201 251/118 |
| 8,424,841 | B2 | 4/2013 | Frenzel |
| 9,377,120 | B2 | 6/2016 | Thomas |
| 9,625,040 | B2 | 4/2017 | Thomas |
| 9,816,625 | B2 | 11/2017 | Warbey |
| 9,903,481 | B2 | 2/2018 | Keller et al. |
| 10,591,069 | B2 | 3/2020 | Russalian |
| 10,801,627 | B2 | 10/2020 | Warbey |
| 10,883,641 | B2 | 1/2021 | Bonomi |
| 11,009,136 | B2 | 5/2021 | Berkovitz et al. |
| 11,105,428 | B2 | 8/2021 | Warbey |
| 11,149,869 | B2 | 10/2021 | England et al. |
| 11,181,201 | B2 | 11/2021 | Ray et al. |
| 11,187,328 | B2 | 11/2021 | Kuhlman et al. |
| 11,209,089 | B2 | 12/2021 | Bergstrom et al. |
| 11,209,100 | B2 | 12/2021 | Bell |
| 11,460,118 | B2 | 10/2022 | Helfer |
| 11,560,959 | B1 | 1/2023 | Barni et al. |
| 2001/0030309 | A1 | 10/2001 | Carlson et al. |
| 2003/0141480 | A1 | 7/2003 | Green |
| 2006/0162792 | A1 | 7/2006 | Oh |
| 2007/0267592 | A1 | 11/2007 | Jorgensen |
| 2011/0062366 | A1 | 3/2011 | Thomas |
| 2014/0209828 | A1 | 7/2014 | Whitmore et al. |
| 2020/0166959 | A1 | 5/2020 | Keller et al. |
| 2021/0396325 | A1 | 12/2021 | England et al. |
| 2022/0136616 | A1 | 5/2022 | Guyer et al. |
| 2022/0145999 | A1 | 5/2022 | Laberty et al. |

FOREIGN PATENT DOCUMENTS

| | | |
|---|---|---|
| EP | 3636970 B1 | 1/2022 |
| WO | 1999/061823 A1 | 12/1999 |
| WO | 2022/118134 A1 | 6/2022 |

* cited by examiner

BALL VALVE, CHARACTERIZED ORIFICE INSERT, AND METHOD OF MAKING THE SAME

CROSS-REFERENCE TO RELATED APPLICATIONS

This application claims priority to, and the benefit of, U.S. Provisional Patent Application No. 63/430,464, filed on Dec. 6, 2022, titled Ball Valve, Characterized Orifice Insert, and Method of Making the Same, which is incorporated herein in its entirety by reference.

TECHNOLOGICAL FIELD

The present subject matter is directed generally to valve assemblies, and more precisely to ball valve assemblies.

BACKGROUND AND SUMMARY

Typical fluid flow valve assemblies generally comprise shut off valves that include mechanisms configured, in an open position, to allow fluid to flow therethrough, and in a closed position, to block the flow of fluid. Among the various types of fluid flow valve assemblies are globe valves. A typical globe valve includes a linearly movable disc configured, in the closed position, to engage a valve seat to block the flow of fluid, an in the open position, to be positioned away from the valve seat in order to allow fluid to flow through the valve. Other types of fluid flow valve assemblies include standard ball valves and V-port ball valves. A standard ball valve generally includes a quarter-turn rotary ball having a substantially cylindrical bore formed therethrough. A V-port ball valve generally includes a quarter-turn rotary ball having a V-shaped bore extending therethrough.

V-port ball valves are coarse control valve products. Traditionally, control applications have required globe valves to provide throttling and process control capabilities. Globe valves provide accurate control and can withstand harsh environments when properly equipped. V-port ball valves use a variable flow path geometry to achieve increased control performance. V-port ball valves generally provide basic control performance at a reduced cost compared to globe valves, which has led to a growing demand for V-port ball valves wherever service conditions allow.

While typically cheaper to produce than globe valves, V-port ball valves are generally more expensive to produce than standard ball valves. Accordingly, it would be desirable to produce a ball valve assembly having performance characteristics similar to a typical V-port valve, which can be produced in a more cost-effective manner.

BRIEF DESCRIPTION OF THE DRAWINGS

The present disclosure is illustrated by way of example and not limitation in the figures of the accompanying drawings, in which like references indicate similar elements and wherein.

DETAILED DESCRIPTION

The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 1:
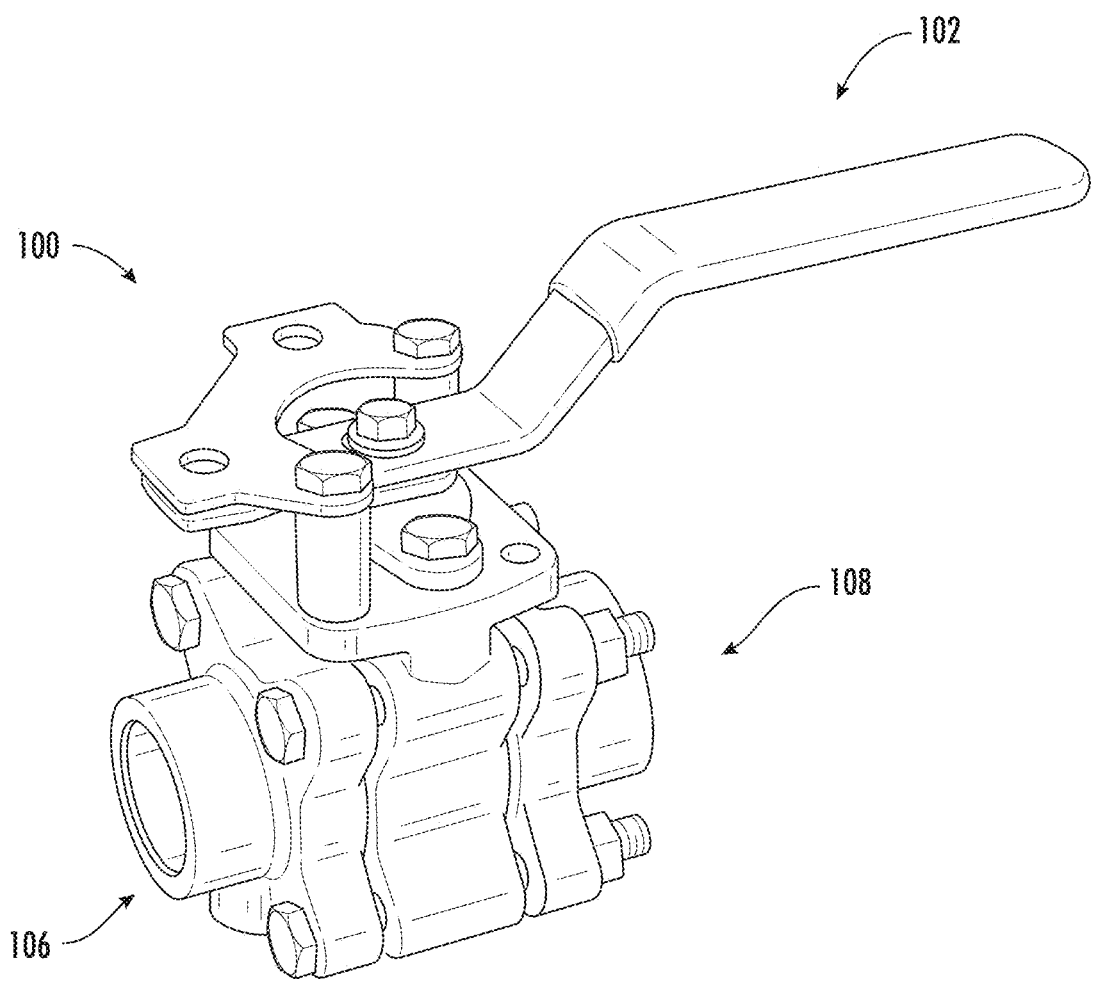
FIG. 1 is isometric view of a ball valve assembly, according to an example implementation of the present disclosure.
Figure 2:
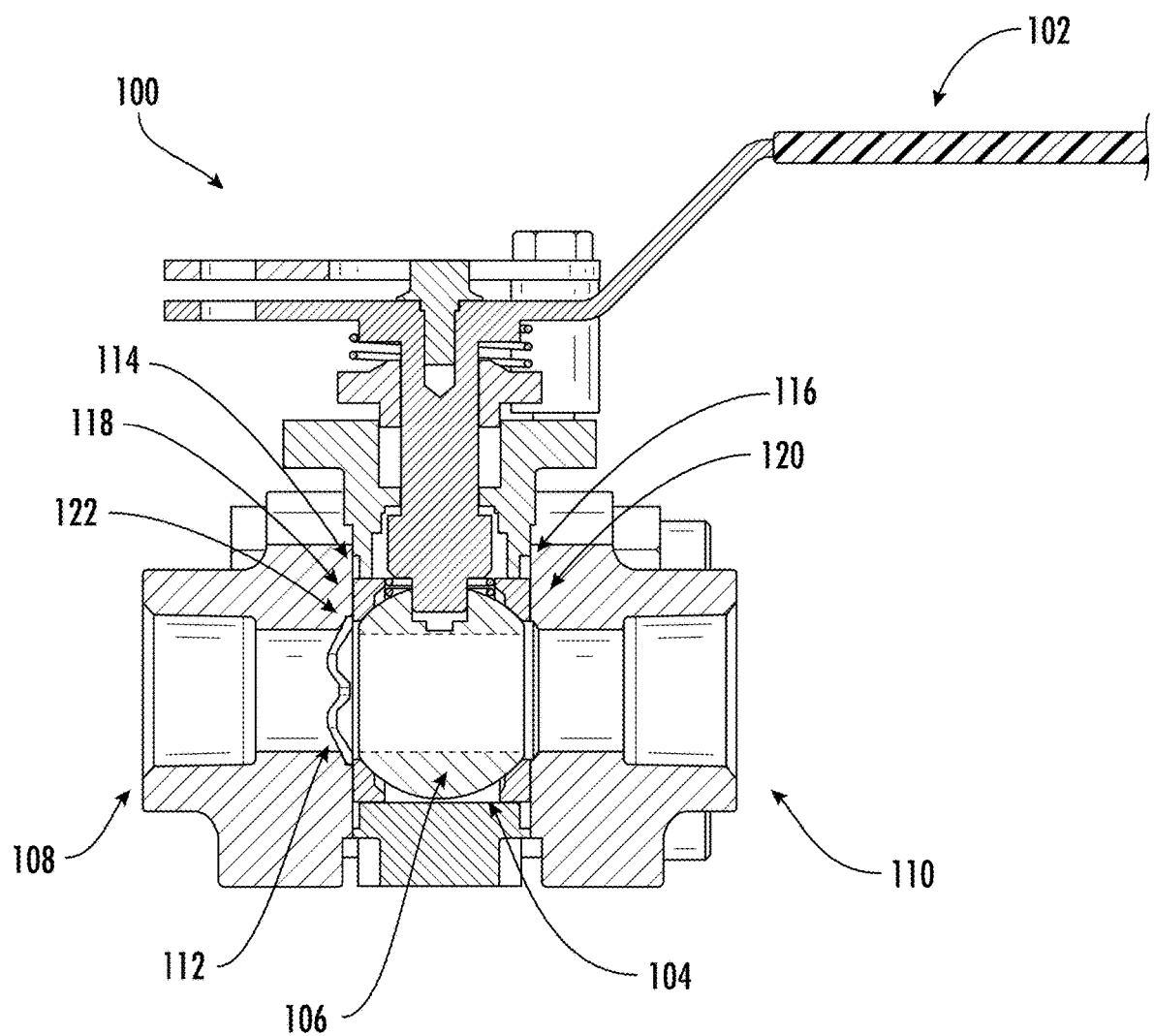
FIG. 2 is a side cross-section schematic view of a ball valve assembly, according to an example implementation of the present disclosure.
Figure 3:
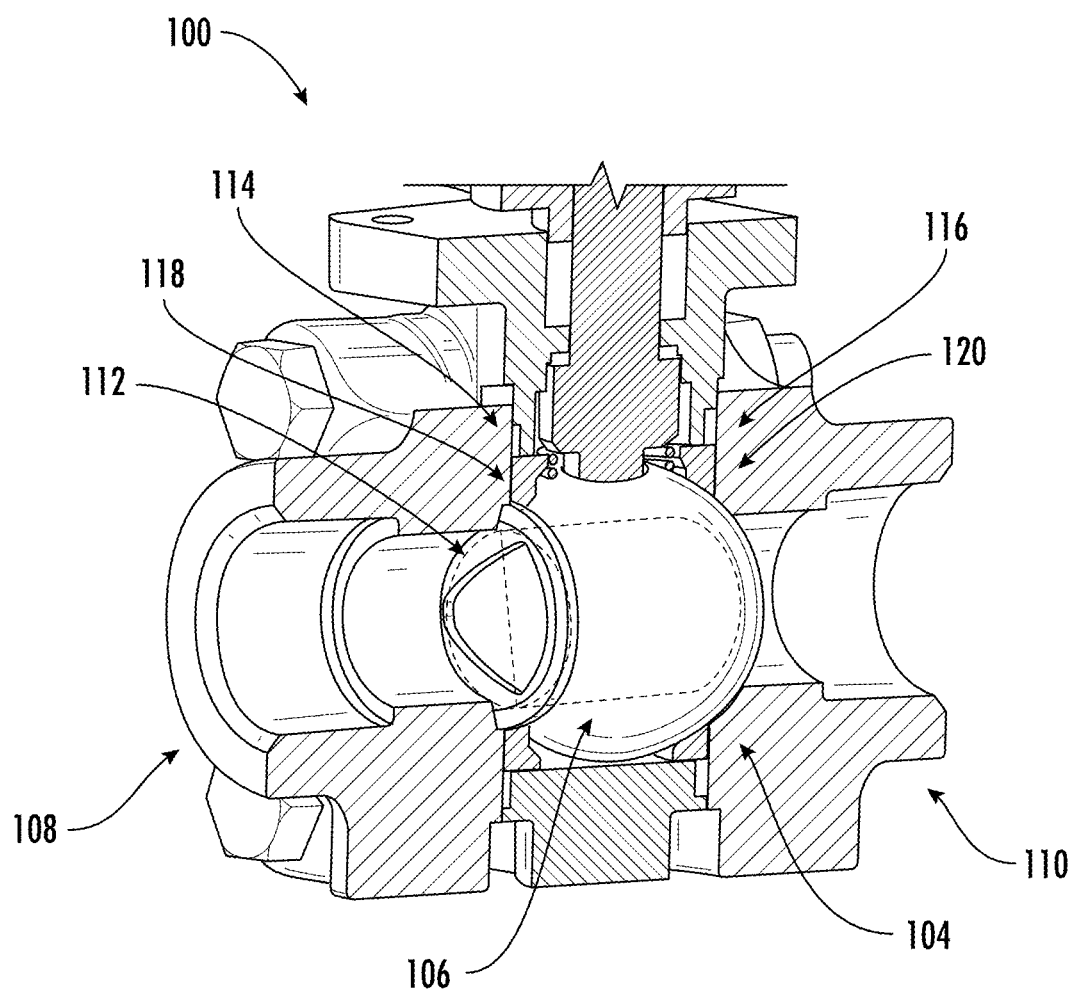
FIG. 3 is a partial isometric cross-section schematic view of a ball valve assembly, according to an example implementation of the present disclosure.

As described hereinafter, implementations of the present disclosure relate to valve assemblies and various components and methods of making the same. FIGS. 1-3 illustrates an example implementation of a ball valve assembly 100, according to the present disclosure. In particular, FIG. 1 illustrates an isometric view of the ball valve assembly 100; FIG. 2 illustrates a side cross-section schematic view of the ball valve assembly 100; and FIG. 3 illustrates a partial isometric cross-section schematic view of the ball valve assembly 100.

As shown in the figures, the ball valve assembly 100 of the depicted implementation generally includes a handle 102, which is mechanically connected to a rotatory ball 104 (shown schematically in the drawing as a shaded feature). In the depicted implementation, the rotary ball 104 includes a substantially cylindrical bore 106 extending therethrough, although in other implementations the rotary ball may include a bore having a different shape. In the depicted implementation, the handle 102 and the rotary ball 104 are configured such than an approximate quarter-turn of the handle 102 rotates the rotary ball 104 an approximate quarter-turn between open and closed positions. In the open position, the bore 106 is aligned with the fluid flow path of the valve assembly 100 and is configured such that fluid flows through the rotary ball 104. In the closed position, the bore 106 is not aligned with the fluid flow path of the valve assembly 100 such that fluid is unable to flow through the rotary ball 104. It should be noted that other implementations need not include a handle, such as, for example, implementations wherein the rotary ball may be rotated via an automated mechanism.

The ball valve assembly 100 of the depicted implementation further includes two end caps, an upstream end cap 108 and a downstream end cap 110. As will be described in more detail below, the ball valve assembly 100 of the depicted implementation also includes a characterization orifice insert 112 configured to be positioned proximate the rotary ball 104. It should be noted that although the depicted implementation includes a single characterization orifice insert 112 located proximate an upstream side of the rotary ball 104, other implementations may have different configurations. For example, in some implementations, a single characterization orifice insert may be located proximate a downstream side of the rotary ball. Still other implementations may include a pair of characterization orifice inserts, with one insert being located proximate an upstream side of the rotary ball and another being located proximate a downstream side of the rotary ball.

As further illustrated in FIGS. 1-3, the depicted implementation of the valve assembly 100 also includes a pair of respective body seals (an upstream body seal 114 and a downstream body seal 116) and pair of respective valve seats (an upstream valve seat 118 and a downstream valve seat 120). When assembled, the body seals 114, 116 and valve seats 118, 120 are configured to be compressed between the end caps 108, 110, such that the valve seats 118, 120 seal opposite sides of the rotary ball 104 to provide sealing along the direction of flow.

Figure 4:
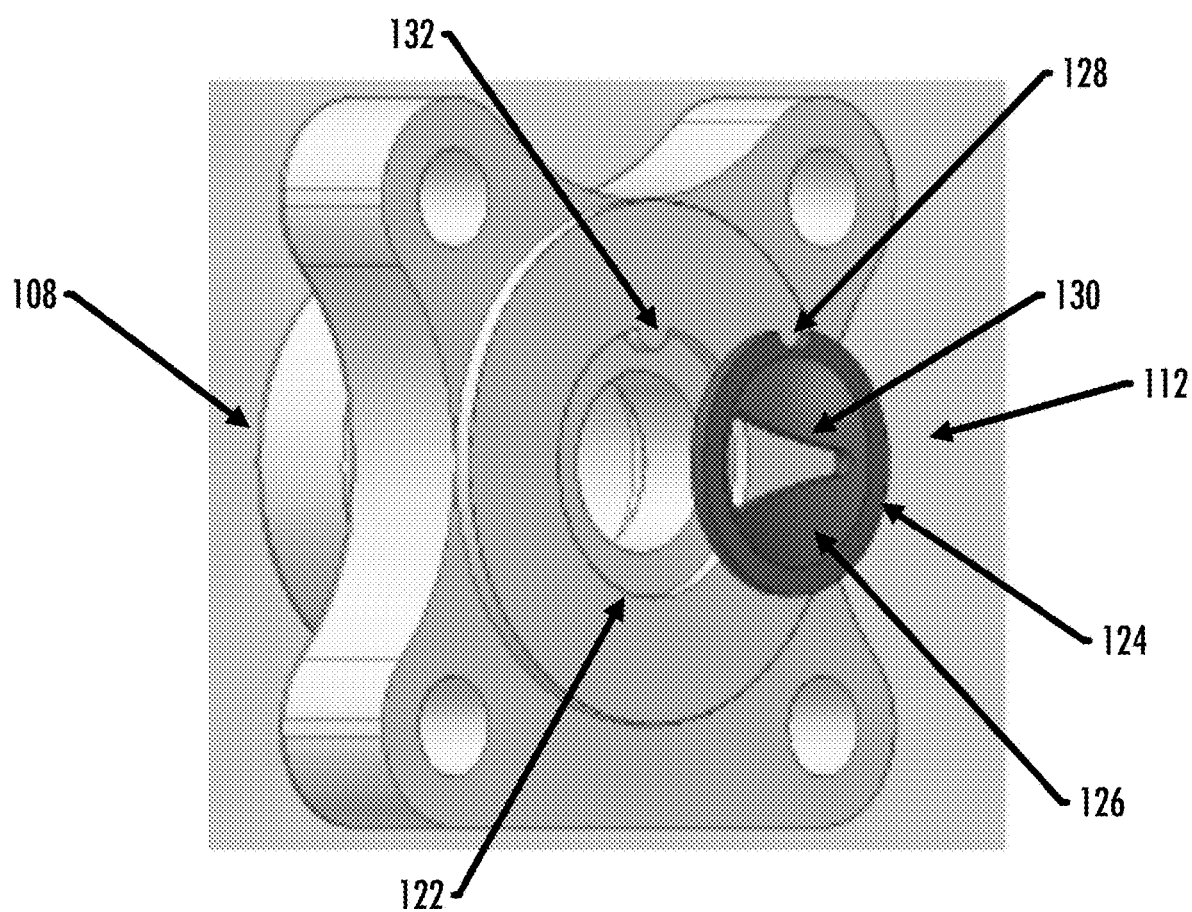
FIG. 4 is an exploded isometric view of an orifice insert and an end cap of a ball valve assembly, according to an example implementation of the present disclosure.

Referring also to FIG. 4, the upstream end cap 108 of the depicted implementation includes a counterbore or recessed feature 122, which is configured to receive the characterization orifice insert 112 therein. As shown in the drawing, in a final state, the characterization orifice insert 112 of the depicted implementation includes an outer flange 124, a body portion 126, a locating feature 128, and a characterization shape 130. In the depicted implementation, the outer flange 124 of the characterization orifice insert 112 is configured to be received within the counterbore feature 122 of the upstream end cap 108, and the locating feature 128 of the characterization orifice insert 112 is configured to be positioned proximate a corresponding locating feature 132 of the upstream end cap 108. In the depicted implementation, the respective locating features 128, 132 are configured such that when assembled, the characterization orifice insert 112 does not rotate (and/or rotation is minimized) relative to the upstream end cap 108.

In the depicted implementation, the locating feature 128 of the characterization orifice insert 112 comprises a female feature (such as, for example, a substantially half-moon shaped cutout or notch) and the corresponding location feature 132 of the upstream end cap 108 comprises a male feature (such as, for example, a substantially half-moon shaped projection) configured to complement the locating feature 128 of the insert 112. It should be noted that in other implementations, locating features having other configurations are possible. For example, in some example implementations, the characterization orifice insert may include one or more flat portions and the end cap may include one or more complementary flat portions. In other implementations, the characterization orifice insert may include two or more cutouts or notches and the end cap may include two or more complementary projections. In still other implementations, the characterization orifice insert may include one or more projections and the end cap may include one or more complementary cutouts or notches. In yet other implementations, the characterization orifice insert may include any combination of notches or projections and the end cap may include a complementary combination of notches or projections.

In the depicted implementation, the body portion 126 of the characterization orifice insert 112 has a semi-spherical shape, configured to substantially match (or closely match) the outer diameter of the rotary ball 104. In the depicted implementation, this allows for a tightly controlled clearance between the rotary ball 104 and the characterization orifice insert 112. Although a variety of configurations are possible, it is believed that an insert having a semi-spherical body portion is desirable to a flat insert, which may require a larger gap between rotary ball and the insert. It is further believed that such a configuration may be detrimental to throttling behavior desired from the V-port type of valve.

In the depicted implementation, the rotary ball 104, the end cap 108, and the characterization orifice insert 112 are made of a metal material such as, for example, stainless-steel. In other implementations, however, any one or any combination may be made of other materials, including, for example, other metal materials such as carbon steel, Duplex, Super Duplex, Nickel, Hastelloy C or Alloy 20. Non-metal materials may also be used, including, for example, ABS plastic materials.

In various implementations, when the valve assembly of the present disclosure is subjected to fluid flow therethrough, the characterization orifice insert and rotary ball combine to mimic (and/or approximate) the operation of a V-port valve. In particular, when rotated, varying amounts of the "V" geometry are exposed to the flow path. As more of the "V" port is exposed, the flow area is increased and more flow is permitted through the valve at a particular condition. This behavior facilitates coarse process control.

Figure 5A:
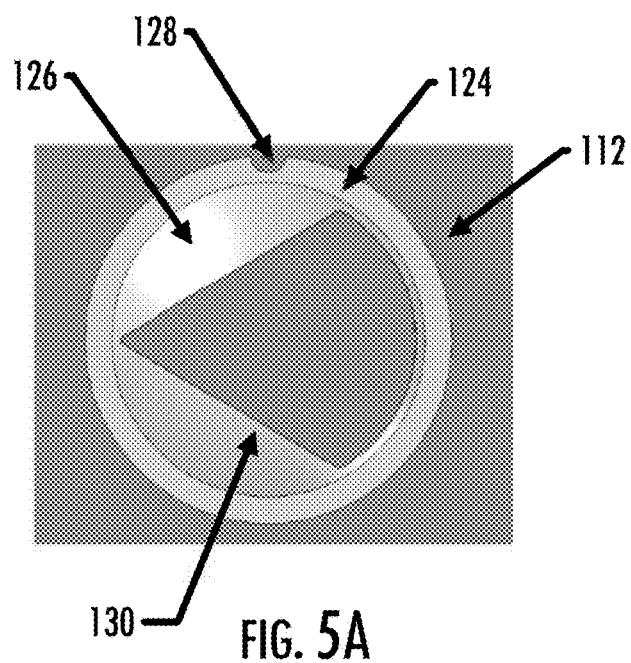
FIG. 5A is a front view of a characterization orifice insert of a valve assembly, according to an example implementation of the present disclosure.
Figure 5B:
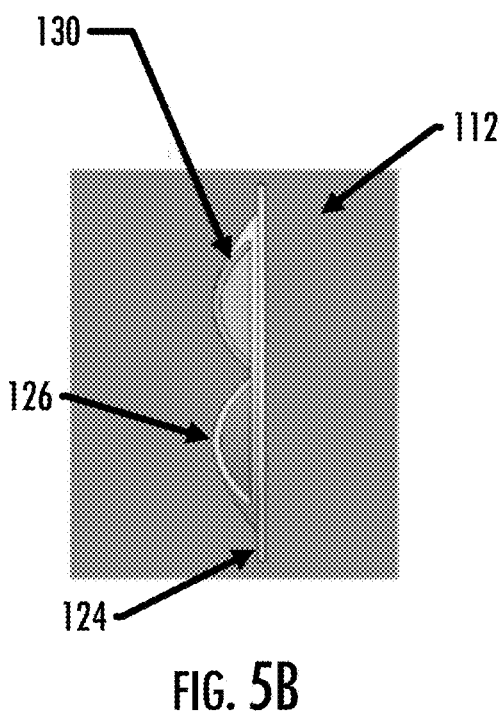
FIG. 5B is a side view of a characterization orifice insert of a valve assembly, according to an example implementation of the present disclosure.
Figure 5C:
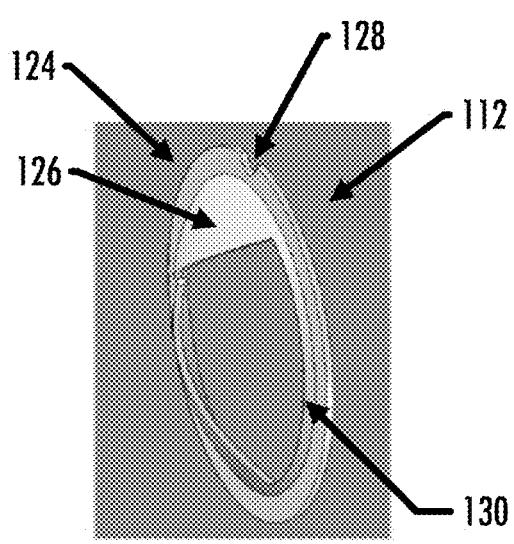
FIG. 5C is an isometric view of a characterization orifice insert of a valve assembly, according to an example implementation of the present disclosure.

Referring to FIGS. 5A-5C, which illustrate various views of a characterization orifice insert according to one example implementation of the present disclosure, the characterization orifice insert 112 of the depicted implementation includes a characterization shape 130 formed though the body portion 126 and thorough which fluid flows when assembled in a valve assembly. In the depicted implementation, the characterization shape 130 comprises a substantially V-shaped geometry. In various implementations, the size of the V-shape (e.g., the angle of the "V" and/or the length, width, and/or placement thereof) may vary depending on the desired flow coefficient. It should be noted that in other implementations, different shapes are possible. For example, some implementations may include a slotted shape. Still other implementations may include a combination of a V-shape and a slotted shape. In the depicted implementation, the characterization shape 130 has substantially straight legs with a curved end and is substantially centrally located on the insert 112. As noted, however, in other implementations, the characterization shape may differ and may be offset relative to the insert.

In various implementations, the characterization orifice insert of the present disclosure may exist first in an initial state and may then be converted and/or formed into a final state, which, in some implementations, may differ in one or more ways from the characterization orifice insert in the initial state. For example, the characterization orifice insert of some implementations may first comprise a substantially flat part having an initial characterization shape. The characterization orifice insert may then be formed into a final state, a portion of which may be semi-spherical, and which may also include a characterization shape that is different than the initial characterization shape.

Figure 6A:
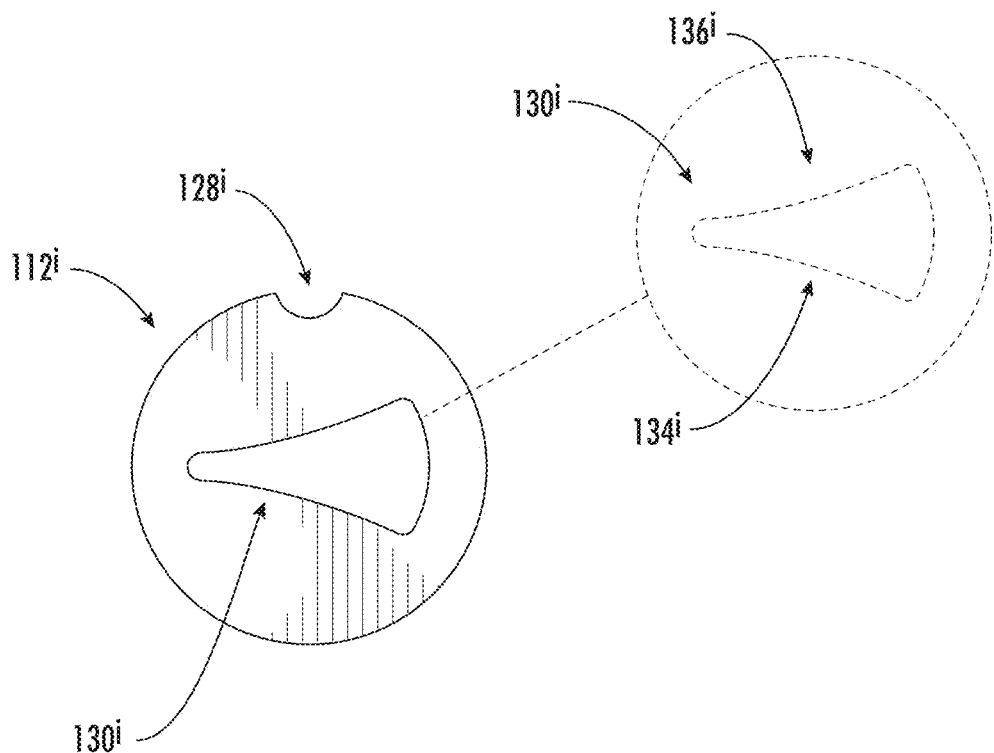
FIG. 6A is a front view of a characterization orifice inset in an initial state, according to an example implementation of the present disclosure.
Figure 6B:
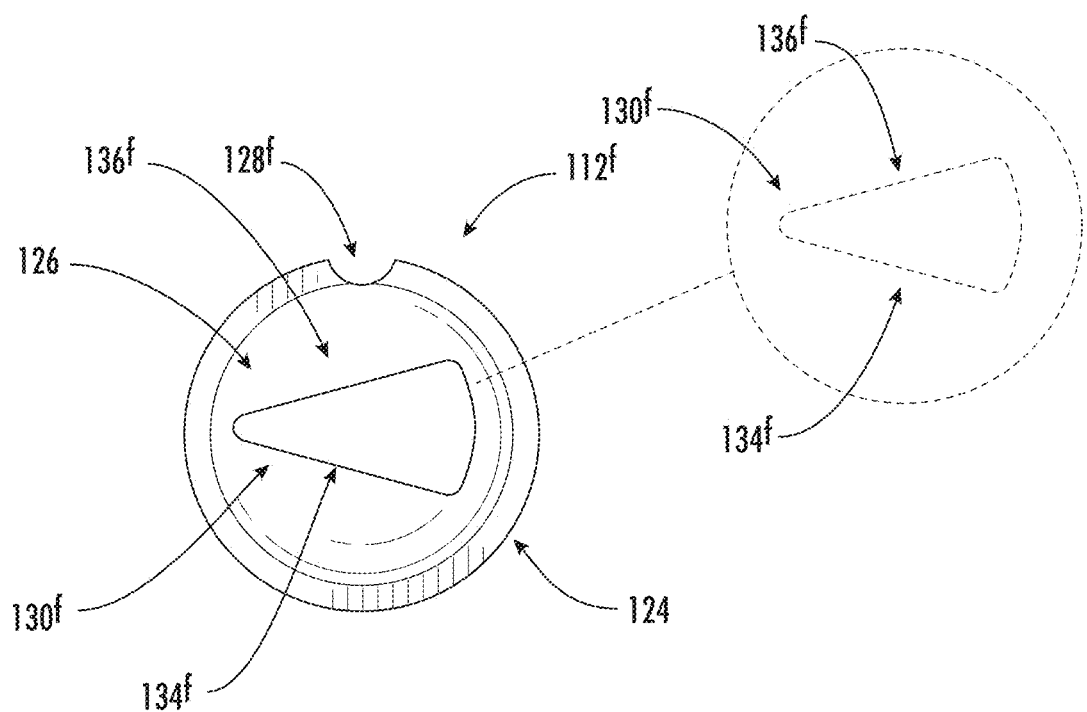
FIG. 6B is a front view of a characterization orifice insert in a final state, according to an example implementation of the present disclosure.

FIG. 6A illustrates one example of a characterization orifice insert in an initial state $112^i$, and FIG. 6B illustrates an example of the characterization orifice insert in a final state $112^f$. In the depicted implementation of FIG. 6A, the characterization orifice insert in the initial state 112$^i$ comprises a substantially flat "coin-like" part that includes an initial locating feature 128$^i$ and an initial characterization shape 130$^i$. In various implementations, the characterization orifice insert in the initial state may be created in a variety of different ways, including, for example, via stamping, CNC machining, sintering, water-jet cutting, wire electrical discharge machining (EDM), etc. In the depicted implementation, the characterization orifice insert in the initial state 112$^i$ comprises a stainless-steel part, with the initial locating feature 128$^i$ and the initial characterization shape 130$^i$ created via CNC machining.

FIG. 6B illustrates the characterization orifice insert of FIG. 6A in a final state 112$^f$. In the depicted implementation, the characterization orifice insert in the initial state 112$^i$ is formed into the characterization orifice insert in the final state 112$^f$ via a stamping and/or mold pressing process, although in other implementations, other manufacturing methods may be used. To create the final state, the characterization orifice insert in the initial state 112$i$ is formed so as to create the semi-spherical body portion 126 and the outer flange 124 extending around the part.

In the depicted implementation, the initial locating feature 128$^i$ and the final locating feature 128$^f$ are substantially same; however, the initial characterization shape 130$^i$ and the final characterization shape 130$^f$ differ. In particular, in the depicted implementation, the characterization shape in the initial state 130$^i$ is specifically configured and designed such that after being converted and/or formed, the final characterization shape 130$^f$ has a desired shape. In such a manner, in various implementations, one or more portions of the outline defining the characterization shape may be configured and designed initially so as to create a desired shape after being converted and/or formed into the final part. For example, in the depicted implementation, the desired final characterization shape 130$^f$ comprises a generally V-shaped opening having substantially straight legs 134$^f$, 136$^f$, as shown in FIG. 6B. To achieve this shape, however, the legs of the characterization shape in the initial state 134$^i$, 136$^i$ are curved, as shown in FIG. 6A, to account for the subsequent curvature of the body portion 126. In some implementations, a mathematical formula may aid in defining an initial characterization shape that will result in a desired final characterization shape after converting and/or forming. For example, in some implementations, such a mathematical formula may include as input variables one or more properties of the characterization orifice insert, including, for example, the final dimensions of the characterization shape, and/or the specific material, desired final surface diameter, and/or thickness of the insert, etc.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A method of manufacturing a ball valve assembly, the method comprising:
providing a pair of end caps;
providing a rotary ball, the rotary ball including a bore formed therethrough;
providing a handle operatively connected to the rotary ball and configured to rotate the rotary ball;
providing a characterization orifice insert, the characterization orifice insert including a characterization shape;
positioning the rotary ball between the pair of end caps; and
positioning the characterization orifice insert proximate the rotary ball,
wherein before the characterization orifice insert is positioned proximate the rotary ball, the characterization orifice insert is converted and/or formed from an initial state into a final state, wherein the characterization shape of the characterization orifice insert in the initial state differs from the characterization shape of the characterization orifice insert in the final state, and wherein the characterization shape of the characterization orifice insert in the final state comprises a V-shaped opening having substantially straight legs, and wherein the characterization shape of the characterization orifice insert in the initial state comprises a V-shaped opening having curved legs.

2. The method of claim 1, wherein the characterization orifice insert is converted and/or formed into the final state via a stamping and/or mold pressing process.

3. The method of claim 1, wherein the step of positioning the characterization orifice insert comprises positioning the characterization orifice insert proximate an upstream side of the rotary ball.

4. The method of claim 1, wherein the step of positioning the characterization orifice insert comprises positioning the characterization orifice insert proximate a downstream side of the rotary ball.

5. The method of claim 1, wherein the step of providing a characterization orifice insert comprises providing a first characterization orifice insert and providing a second characterization orifice insert, and wherein the step of positioning the characterization orifice insert comprises positioning one of the first or second characterization orifice inserts proximate an upstream side of the rotary ball and positioning the other of the first or second characterization orifice inserts proximate a downstream side of the rotary ball.

6. The method of claim 1 further comprising providing a pair of respective upstream and downstream body seals and pair of respective upstream and downstream valve seats, and positioning the upstream and downstream body seals and the upstream and downstream valve seats such that they are compressed between the end caps.

7. The method of claim 1, wherein the characterization orifice insert includes an outer flange and a body portion, and wherein the characterization shape is defined in the body portion.

8. The method of claim 1, wherein at least one of the end caps includes a counterbore defined therein, and wherein the counterbore is configured to receive at least a portion of the characterization orifice insert.

9. The method of claim 1, wherein the characterization orifice insert includes a locating feature, and wherein at least one of the end caps includes a corresponding location feature configured to engage the locating feature of the characterization orifice insert.

* * * * *